United States Patent [19]

Allen, Jr. et al.

[11] Patent Number: 4,702,273
[45] Date of Patent: Oct. 27, 1987

[54] ELECTRICALLY CONTROLLED STARTER AIR VALVE

[75] Inventors: Kenneth C. Allen, Jr., Utica; Robert H. Findlay, Hinckley, both of N.Y.

[73] Assignee: Parker Hannifin Corporation, Cleveland, Ohio

[21] Appl. No.: 836,695

[22] Filed: Mar. 7, 1986

[51] Int. Cl.⁴ .......................................... F16K 31/128
[52] U.S. Cl. ............................ 137/487.5; 251/129.05; 251/30.01; 123/179 F; 60/625
[58] Field of Search ............ 251/30.01, 30.02, 129.05; 137/487.5; 123/179 F; 60/625, 627

[56] References Cited

U.S. PATENT DOCUMENTS

| | | | |
|---|---|---|---|
| 2,800,921 | 7/1957 | Wright | 251/30.01 X |
| 2,938,537 | 5/1960 | Silver et al. | 251/30.01 X |
| 3,462,115 | 8/1969 | Barker | 251/30.01 X |
| 3,952,759 | 4/1976 | Ottenstein | 137/487.5 X |

FOREIGN PATENT DOCUMENTS 493169  10/1938  United Kingdom ............. 251/30.02

*Primary Examiner*—Arnold Rosenthal
*Attorney, Agent, or Firm*—Christopher H. Morgan

[57] ABSTRACT

The disclosed electrically controlled starter valve (10) regulates the flow of compressed gas to an air turbine starter (11) and precisely controls the way in which the flow is reduced after start of the aircraft engine. The electronic control system (30) is responsive to previously uncompensated for engine system variables. The main valve is a butterfly valve (12) controlled by an air actuator (14). A solenoid valve (16) in the air supply line (15, 17) to the actuator (14) is switched on and off at discrete intervals to provide for positioning of the butterfly valve (12). A position transducer (R2) senses position of the butterfly valve (12) and provides a position feedback signal. A pressure transducer (R1) senses pressure at the inlet to the butterfly valve (12) and provides an inlet pressure feedback signal. The position and pressure feedback signals are fed to an electronic control circuit (30) and are used to compensate for changing conditions to provide a consistent valve (12) closing pattern.

3 Claims, 2 Drawing Figures

ELECTRICALLY CONTROLLED STARTER AIR VALVE

BACKGROUND OF THE INVENTION

1. Field of the Invention

This invention relates to an aircraft starter and more particularly to a control system for a starter valve which regulates air flow to an air turbine starter for an aircraft.

2. Description of Prior Art

Air turbine type starter motors, such as the Bendix 36E163 Air Turbine Starter, operating with the energy of a compressed gas such as air, are often used for starting an aircraft gas turbine engine. The compressed air for the air turbine starter is controlled by a starter valve, such as a Bendix 38E73 air regulating and shut-off butterfly valve.

A source of relatively clean dry air is required to power the air turbine starter. The most common source of air for this purpose are an accessory power unit, bleed air from the compressor stage of another operating gas turbine engine, or a gas turbine ground cart. Upon actuation of the engine start switch, the starter valve is energized permitting air to flow to the air turbine starter. The air turbine starter output engages the engine which is then accelerated to a predetermined cut off speed. The start cycle may be terminated manually by the pilot opening the start switch or automatically by a speed sensitive switch built into the starter. When the start cycle is terminated, the starter valve is closed cutting off the compressed air supply to the air turbine starter. When starting air is cut off, the air turbine starter will automatically disengage from the engine accessory drive shaft and come to a stop.

The starter valve controls the operation of the air turbine starter by means of a controlled opening rate of the valve, a controlled closing rate, and/or a pressure regulating system which delivers substantially constant pressure to the starter regardless of the upstream air pressure. These functions in a conventional starter control valve are implemented by mechanical-pneumatic control devices such as orifices, needle valves, springs and diaphrams. Limitations of these devices include design and manufacturing complexity, difficulty of adjustment, sensitivity to environmental changes and poor repeatability.

An aircraft starter control system for automatically closing a solenoid operated air valve, that supplies pressurized air to rotate an air turbine starter engine of an aircraft engine, when the starter rotor reaches a predetermined rotational speed, is described in U.S. Pat. No. 3,812,378 by inventor William E. Coman. A permanent magnet attached to the air turbine starter rotor induces pulses in a coil which through a control circuit causes shut off of the pressurized air supply when the air turbine starter reaches a predetermined speed.

SUMMARY OF THE INVENTION

The present invention teaches an electronic control circuit which compensates automatically and continuously during closing, to close a starter valve, which provides air to an air turbine starter, precisely in the same pattern under a wide range of engine starting conditions. The disclosed electronic control system is responsive to engine system variables for which compensation was previously not provided. Pressure and position sensor feedback is provided to an electronic control unit which provides an output for controlling a solenoid operated valve controlling air flow to an air actuator which positions the butterfly disc in a starter valve.

The disclosed control system controls the way in which flow to the air turbine starter is reduced after start of the aircraft engine. Unlike prior art starter valves in which pneumatic and valve components determine the flow characteristic for closing and are selected for average condition and therefore will close differently under different conditions; the disclosed starter valve continuously compensates during closing to close the same under different conditions. Upon initiation of starter valve closing, closure is controlled by a series of discrete program steps, which are feedback compensated for inlet air pressure and butterfly seat position, to provide a uniform closing pattern.

BRIEF DESCRIPTION OF THE DRAWINGS

For a better understanding of the invention, reference may be had to the preferred embodiment exemplary thereof shown in the accompanying drawings in which.

DETAILED DESCRIPTION OF THE INVENTION

Figure 1:
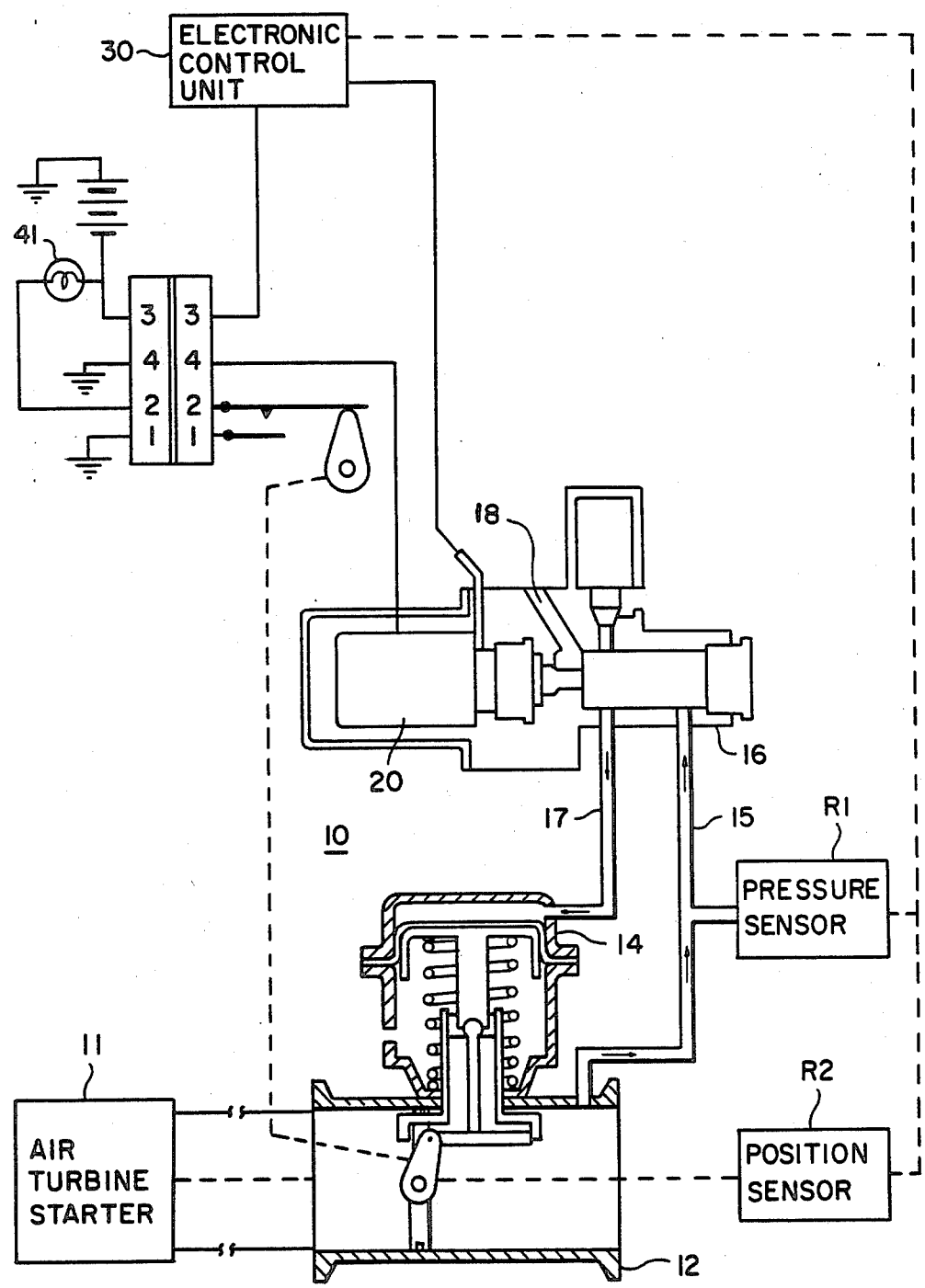
FIG. 1 is an illustration of an electrically controlled starter air valve according to the present invention.

Referring now to the drawings there is shown an electrically controlled starter valve constructed according to the teaching of the present invention. A butterfly valve 12 is opened and closed by an air actuator 14 in response to positioning of poppet valve 16 by a solenoid 20. Various aircraft engines utilize air turbine starters 11 which are driven by a supply of pressurized air fed through the butterfly valve 12. Through actuation of the engine start switch, pressurized air is permitted to flow through the butterfly valve 12 to air turbine starter 11. The air turbine starter 11 engages the aircraft engine which is then accelerated to start speed. The air supply to the air turbine starter 11 is then cut off by closing the butterfly valve 12. The starter will then automatically disengage and come to a stop.

Operation of air actuator 14 to open and close butterfly valve 12 is controlled by a double ended poppet valve 16. Opening of butterfly valve 12 is controlled by supplying air pressure above the diaphram of actuator 14. Air to actuator 14 is controlled by positioning poppet valve 16. Pressurized air is fed through line 15 and regulated by poppet valve 16 to supply the desired air pressure to position actuator 14 and the mechanically connected disc of butterfly valve 12. During operation of poppet valve 16, air can be vented through vent 18. Opening and closing of poppet valve 16 is controlled by energizing and de-energizing solenoid 20. Positioning of the butterfly valve disc is controlled by the air pressure applied to actuator 14, which is controlled by opening and closing poppet valve 16. Poppet valve 16 is controlled by the valve solenoid 20, which is actuated by the electronic control unit 30. Poppet valve 16 is spring biased closed and solenoid 20 must be energized before poppet valve 16 can open. Actuator 14 is spring biased to a position shown in FIG. 1 closing valve 12. If either the pneumatic upstream pressure, supplied through line 15, or the electrical power to solenoid 20 are lost, actuator 14 will close valve 12.

Upon application of 28 volt power to pin number P3 of the valve connector 28, holding coil 32 of relay 33 is energized closing its associated normally open contacts and providing power on line 34. The ground connection path for both the valve solenoid 20 and the holding coil 32 of relay 33 is through pin P4 of connector 28 and through the normally closed contacts B2-B3 of the aircraft mounted start relay 36. Providing +28 VDC power on line 34 energizes solenoid 20. When the valve solenoid 20 is energized, the solenoid plunger is drawn into the solenoid body allowing inlet air pressure in line 15 to move and open poppet valve 16 and flow to the upper chamber of air actuator 14. Actuator 14 has an output mechanically linked to open butterfly valve 12 when air enters the actuator upper chamber above the diaphram. As the butterfly valve 12 opens, two interconnected microswitches 40, 42 move to the closed position. When microswitch 40 closes it activates the valve open light 41 in the cockpit. When microswitch 42 closes it activates the controlled closing circuit of the electronic control unit 30.

Figure 2:
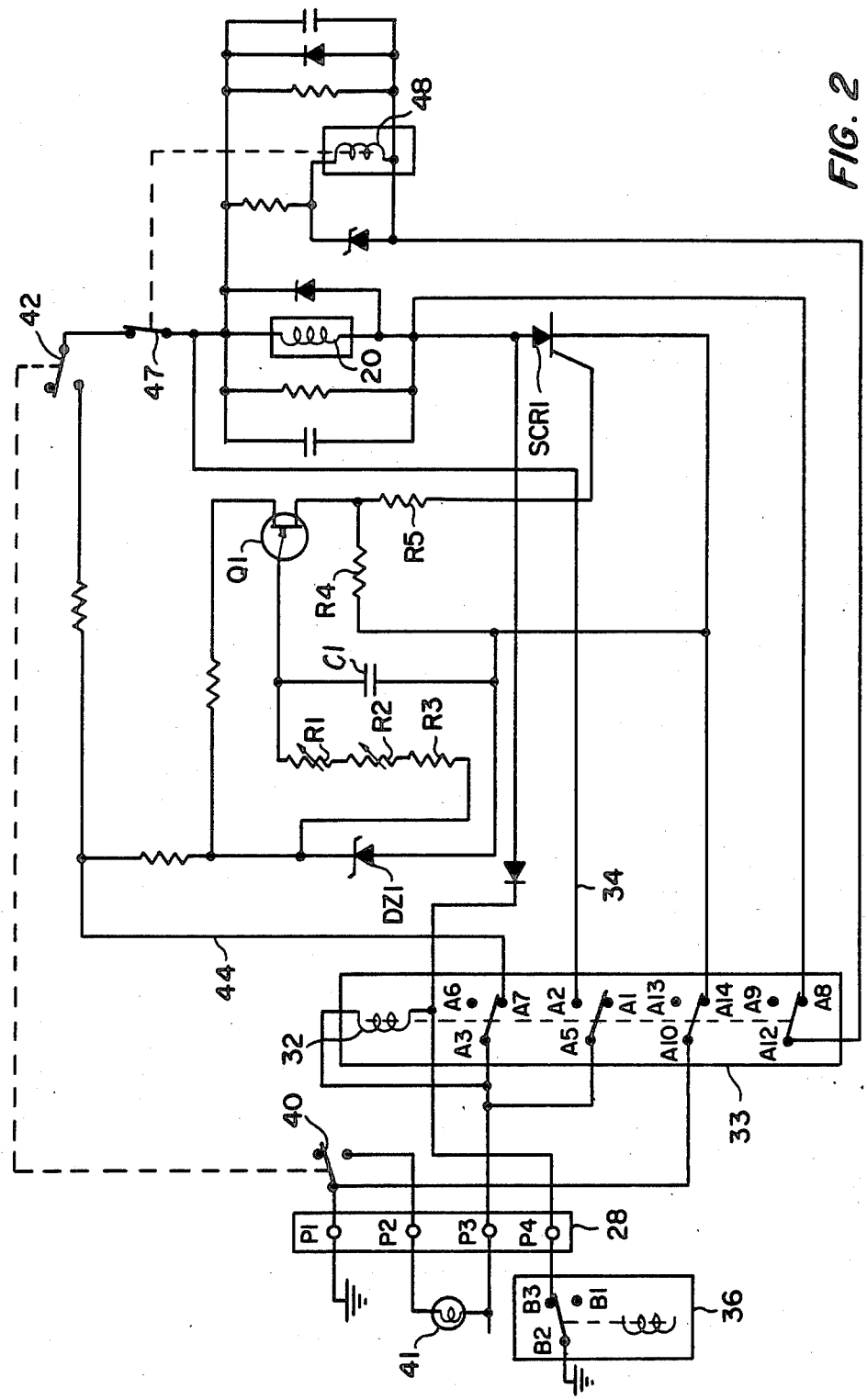
FIG. 2 is an electrical schematic of the electronic control unit which controls the starter air valve.

When valve 12 opens compressed air is supplied to the air turbine starter 11 which will initiate an engine start. At a specific start speed, a signal is sent that indicates the engine is started and energizes the aircraft mounted start relay 36 causing contacts B2-B3 to open. When relay 36 picks up, opening contacts B2-B3, the ground path for holding coil 32 is removed causing it to immediately de-energize. When relay 33 drops out the relay 33 contacts will assume the deenergized positions as shown in FIG. 2. When relay 33 is de-energized contacts R3-R7 close applying the 28 volts power along line 44 to the closing circuitry. At the same time power is removed from line 34 to the valve solenoid 20. Closed contacts R10-R14 connect the output of a silicon controlled rectifier, SCR1 to ground. Closed relay 33 contacts R12-R8 connect the coil of interrupter relay 48 around valve solenoid 20.

When holding relay 33 is de-energized at the receipt of the cut off signal from the starter, 28 volt power is supplied to the closing circuitry. As this happens, regulated 15 volt power is applied to capacitor C1 by the action of 15 volt zener diode, DZ1. Capacitor C1 begins charging from this 15 volt supply through series resistors R1, R2 and R3 which control the rate of charge. When the charge on capacitor C1 reaches approximately 9.3 volts the unijunction transistor Q1 turns on, discharging capacitor C1 through two 24 ohm resistors, R4, R5. Discharge current from capacitor C1 through resistor R5 provides a trigger current to the gate of SCR1, causing SCR1 to conduct. When SCR1 conducts the valve solenoid 20 is energizing opening poppet valve 16 allowing air to enter the actuating piston upper chamber of actuator 14. When valve solenoid 20 is energized the interrupter relay 48 is simultaneously energized. Energizing interrupter relay 48 opens its contacts 47 initiating shut down of SCR1. The described process then starts again and repeats at regular intervals. During the charging time of capacitor C1, the valve solenoid 20 is de-energized and the actuator chamber vents to ambient atmosphere and during the on-time air is being added to the actuator chamber. Thus, the circuitry by turning on and off is controlling venting and pressurization of the actuator 14 piston chamber and hence, the closing of butterfly valve 12. The described circuitry provides a series of discrete program pulses to valve solenoid 20 determined by the selected values of resistors R1, R2 and R3.

The valve 12 operates over a range of inlet pressure and, therefore, over a range of flow conditions. When the inlet air pressure to valve 12 is low, the valve tends to close faster then at a higher inlet air pressure. To provide the same closing pattern under all air pressure conditions, resistor R1 has been added. Resistor R1 is essentially a pressure dependent linear potentiometer that senses air inlet pressure. At lower air inlet pressures it presents a lower resistance and increases the pulse frequency. At higher inlet pressures it presents a higher resistance and decreases the pulse frequency. Positioning of potentiometer resistor R1, by the pressure in line 15, therefore controls the closing rate of valve 12 at all extremes of air inlet pressure.

The butterfly position potentiomer R2 is connected directly to the butterfly valve 12 shaft and controls the rate at which the pulsation frequency changes as a function of butterfly valve position, decreasing it or increasing it to provide a smooth, controlled flow rate of change through the valve. Potentiometer R2 will act as an open circuit for the first 20 degrees of butterfly movement to initiate a rapid closure until the flow rate begins to be affected. The resistance pattern of potentiometer R2 will precisely control the pulsation rate of the solenoid valve 20 relative to the butterfly valve 12 position.

Resistor R3 is selected as a fixed value to tailor the circuitry to individual valve characteristics and compensates for circuitry and valve tolerances. When valve 12 reaches the 5° open position, the actuator linkage opens the microswitches 40, 42, de-energizing the valve open light 41 and opening the valve solenoid circuit, completing closing of the valve 12.

In conclusion, upon receipt of the cut off signal from the starter, the closure of valve 12 is controlled by a series of discrete programmed steps, feedback compensated for inlet air pressure, with a constant butterfly valve position feedback link. The disclosed circuitry insures a uniform and precise closure. The flow of air to the engine starter after it reaches start speed is controlled and reduced at a specified rate which will control how the starter disengages from the start mechanism. The flow rate from the device supplying the air required for operation is also being controlled to smooth and stabilize performance. With slight modifications the disclosed circuitry can be used to control valve opening, to further enhance starter and valve performance. Failure of any component within the circuit which causes the valve solenoid 20 to deenergize will cause immediate closure of valve 12. Failure of a component which keeps the valve solenoid energized will keep butterfly valve 12 open. A conventional time delay circuit, not shown, can be provided in the electronic control unit to de-energize the valve solenoid 20 if the butterfly is not closed within a selected time such as 6 seconds, to immediately close valve 12.

What is claimed:
1. An electrically controlled starter valve comprising:
   an air turbine conduit through which pressurized air can be supplied to an air turbine starter;
   a butterfly valve connected to control the flow of air through said turbine air conduit and, thereby, the operation of an air turbine starter;
   an air actuator mechanically connected to said butterfly valve so that air pressure in said air actuator is mechanically converted to open and close said butterfly valve;
   a control air conduit connected to said air actuator;

a solenoid operated air conduit valve connected to control the flow of air through said control air conduit and, thereby, the air pressure in said air actuator, said solenoid operated air conduit valve including a solenoid which opens and closes said valve;

a pressure transducer connected to electrically sense the pressure of air in said control air conduit; and an electrical drive circuit for operating said solenoid operated air conduit valve, including an oscillator closing drive circuit which turns said solenoid on and off as said butterfly valve is closing in order to control the rate of air pressure change in said air actuator and, thereby, the rate of closing of said butterfly valve, said oscillator closing drive circuit being electrically connected to said pressure transducer so that the rate at which said solenoid is turned on and off is responsive to said pressure in said control air conduit to maintain a predetermined closing rate of said butterfly valve despite pressure changes in said control air conduit.

2. The starter valve of claim 1 which further comprises:

a position sensing means connected to electrically sense the position of said butterfly valve, and wherein:

said oscillator closing drive circuit is connected to said position sensing means so that the rate at which said solenoid is turned on and off is responsive to said position sensing means to maintain a predetermined closing rate of said butterfly valve according to the position of said butterfly valve.

3. The starter valve of claim 2 wherein said control air conduit is connected to receive pressurized air from said turbine air conduit.

* * * * *